April 28, 1964  J. DENNETT ETAL  3,131,046
MULTIPLE GLAZED WINDOW UNITS
Filed June 16, 1958  4 Sheets-Sheet 1
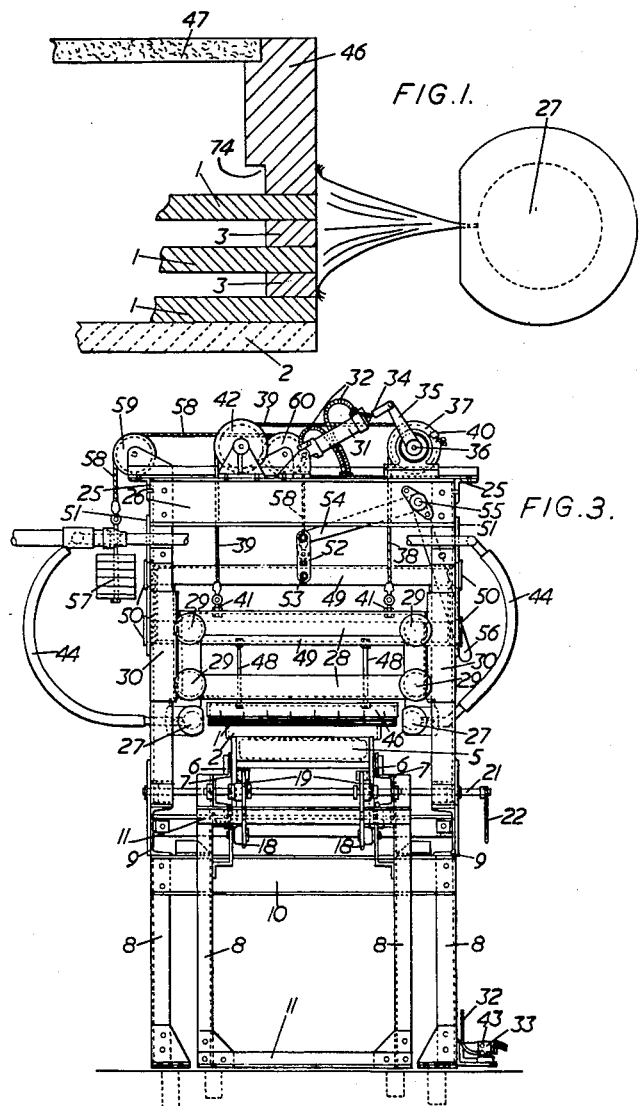
Inventors
John Dennett
Robert E. Croscroft
By
Morrison Kennedy Campbell Attorneys

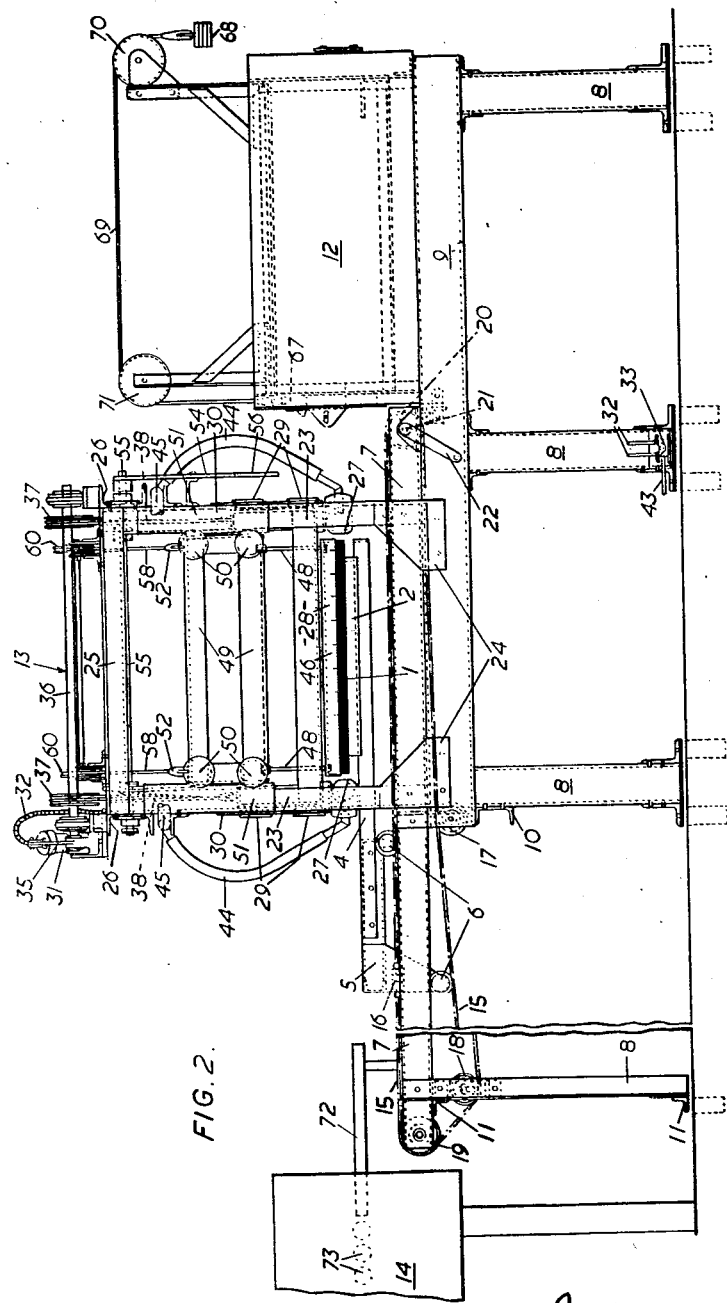

April 28, 1964   J. DENNETT ETAL   3,131,046
MULTIPLE GLAZED WINDOW UNITS
Filed June 16, 1958   4 Sheets-Sheet 3
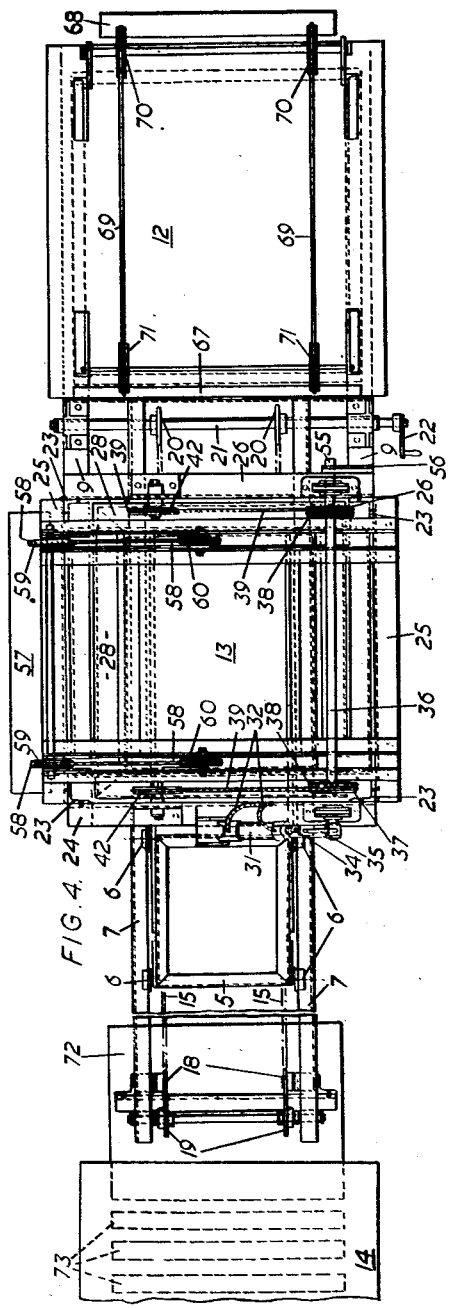
Inventors
John Dennett
Robert E. Ashcroft
By
Morrison Kennedy Campbell
Attorneys

United States Patent Office

3,131,046
Patented Apr. 28, 1964

3,131,046
MULTIPLE GLAZED WINDOW UNITS
John Dennett and Robert Edward Ashcroft, St. Helens, England, assignors to Pilkington Brothers Limited, Liverpool, England, a corporation of Great Britain
Filed June 16, 1958, Ser. No. 742,264
Claims priority, application Great Britain June 18, 1957
1 Claim. (Cl. 65—58)

This invention relates to multiple glazed units, e.g., window units and has for its main object to provide a multiple welded unit of parallel glass panels separated by air spaces.

A method of manufacturing a multiple glazed unit according to the invention consists in stacking on a support the glass panes which are intended to be incorporated in the unit in desired spaced relation by interposing marginal spacer elements of glass of similar coefficient of thermal expansion to that of the panes, arranged to constitute a continuous spacing frame, heating the assembly, subjecting the heated assembly to marginal pressure, and then applying welding heat to the edges of the assembly while conserving the heat in the middle area of the top pane until an integral unit of panes and spacer elements is obtained, the pre-heating of the assembly effected prior to welding being such that the assembly is hot enough to accept the welding heat applied to the edges without harmful strain in the panes and spacers.

The use between adjacent panes of spacers having a transverse dimension equal to the desired thickness of the air space beween the panes makes it unnecessary to deform the margins of the panes, and further makes it possible to manufacture units of panes which, for any reason, such as their thickness, could not be bent or deformed sufficiently to bring the margins together to form the means for holding the panes in desired spaced relationship, and the production of multiple glazed units, including double glazed units, can be achieved by welding.

The invention also comprehends apparatus for applying welding heat to the edges of an assembly of glass panes intended to constitute a multiple glazed unit, the panes being spaced by marginal spacer elements of glass of similar coefficient of thermal expansion to that of the panes, comprising a structure including a support for the assembly, a profile burner for applying welding heat to the edges of the assembly mounted on the said structure, actuating means carried by the structure to effect relative movement between the said support and the burner to locate the assembly within the profile burner, a marginal frame of predetermined weight, for engaging the upper surface and applying the desired pressure during the welding of the panes and spacer elements carried by the structure, means for lowering and raising the frame to and from the assembly, and a sheet of heat insulating material for the top pane extending across the frame.

Preferably the structure includes rails and a carriage running on the rails, the carriage including shafts on which the support for the assembly is slidably carried, an oven for preheating the assembly, said rails extending from said oven under the burner whereby the assembly can be moved from the oven to the burner to effect welding, the burner being vertically adjustable to be lowered about or raised from an assembly supported on the shafts, whereby said assembly can be subjected to welding heat after the marginal frame has been lowered to provide the desired pressure on the assembly.

In order that the invention may be clearly understood a preferred embodiment thereof will now be described by way of example with reference to the accompanying drawings, in which:

FIGURE 1 is a section through an assembly of glass panes, spacers and a marginal frame, FIGURE 2 is a side elevation, partly cut away, of apparatus for applying welding heat to the edge of the assembly.

FIGURE 3 is an end elevation, partly cut away of the apparatus,

FIGURE 4 is a plan view of the apparatus shown in FIGURES 2 and 3,

Figure 5:
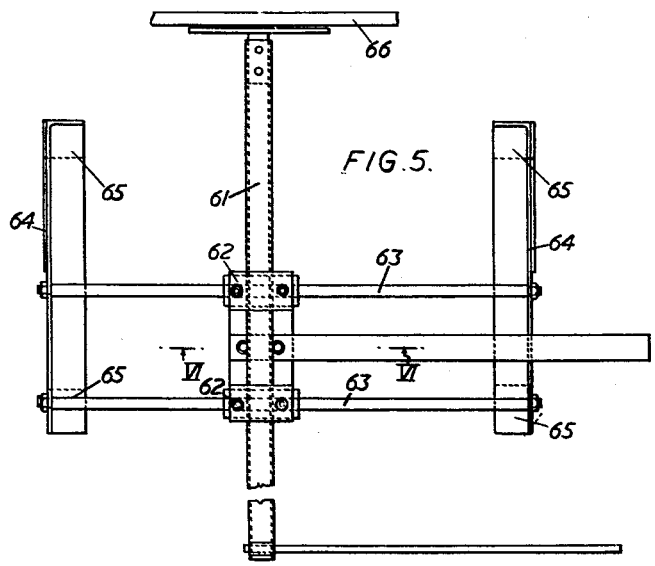
FIGURE 5 shows, in plan view, an ancillary structure for use in displacing as assembly of glass panes and spacers.
Figure 6:
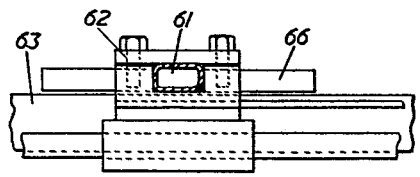
FIGURE 6 is a part sectional elevation taken on line VI—VI of FIGURE 5.

Referring to FIGURE 1 of the drawings, glass panes 1 which are to be incorporated in a multiple glazed unit intended to be employed as a window unit are stacked for welding on a support 2. The panes 1, of which three are shown, are maintained in desired spaced relationship by an interposed set of marginal spacer elements 3 of glass of substantially the same length as the edges of the panes and of similar coefficient of thermal expansion to that of the panes, thus each set of elements forms a continuous spacing frame of glass between a pair of panes. In this way no harmful permanent stresses will be set up in the welded unit as a result of differences in thermal expansion and contraction between the panes 1 and the elements 3 when welded together. The spacer elements 3 may be cut obliquely at their ends to form mitred joints or may have square ends so that the one end of each element meets the inner side of another at each corner of the glass frame.

Moreover the glass frame may be constituted by opposed pairs of elements of different lengths, the ends of the smaller pair meeting the inner sides of the other pair.

Referring now to FIGURES 2 to 4 of the drawings, apparatus for applying welding heat to an assembly of glass panes intended to constitute a multiple glazed unit according to the invention comprises a structure which includes the support 2. The support 2 consists of a flat table of heat-resisting steel, cast iron, refractory material such as sillimanite tiles, or insulating material such as asbestos, or graphite.

The support 2 is located on shafts 4 which are attached to a carriage 5 which latter is provided with wheels 6 which engage the upper and lower surfaces of rails 7 to prevent tilting. The rails 7 are mounted on a framework comprising posts 8, and longitudinal beams 9, transverse beams 10 and transverse angle bars 11. The longitudinal beams 9 extend horizontally under an oven 12, and the rails 7 extend under a welding station 13 to an annealing lehr 14. The beams 9 support an oven 12 and extend under a welding station generally indicated at 13, and the rails 7 extend into the welding station and in the opposite direction to the oven 12, that is, to an annealing lehr 14, so that an assembly of panes and spacer elements on a support 2 may be transported on the shafts 4 into the oven 12, thence to the welding station 13 and after the welding operation is finished, transferred into the lehr 14.

Movement of the carriage 5 and shafts 4 is effected by an endless chain 15 the ends of which are connected to a tensioning member 16 mounted on the carriage. The chain passes over toothed idler wheels 17, 18 and 19, and over toothed drive wheels 20 which are fixed to a shaft 21 and manually rotated by a handle 22.

The oven 12 may be heated either electrically or by gas, and the assembly is heated in the oven to a temperature which is not high enough to cause the panes 1 to sag or become deformed, but is high enough to allow the subsequent heating of the edges of the assembly at a high welding temperature without setting up excessive mechanical stresses in the glass which would ultimately break the glass. For ordinary lime-soda-silica window glass panes, or plate glass, which are used for the manufacture of multiple glazed window units according to the invention, a suitable oven temperature is about 500° C.

When the assembly has attained the temperature of the oven the carriage 5 is moved along the rails 7 until the assembly is located at the welding station 13.

At the welding station 13 is erected a framework consisting of corner posts 23, attached to the beams 9 by gussets 24, and beams 25 and 26 connecting the upper ends of the posts 23. This framework supports a profile burner 27 which consists of four sections, corresponding to the four edges of an assembly when it is located at the welding station, thus welding heat may be applied to the edges of the assembly so positioned.

The burners are mounted on the underside of a chassis 28, which at each corner is provided with a wheel 29 which runs on a guide plate 30 carried on the adjacent post 23 at the welding station, and with the chassis 28 can be raised from or lowered to the support 2 carrying the glass assembly, by actuating means which includes a pneumatic double acting cylinder 31 the two operative ends of which are connected by flexible piping 32 to a foot control valve 33. A piston rod 34 is connected to the double acting piston, not shown, within the cylinder and is pin-jointed to one end of a lever 35, the other end of which is formed as a boss which is fitted to a shaft 36 to which it is keyed or otherwise secured so as to impart rotational movement thereof. Double-sheaf pulleys 37 are mounted on the shaft 36, and the ends of two ropes 38, 39 are fixed to each pulley 37 by clamps 40. The other ends of ropes 38, 39 are connected to the burner chassis 28, as indicated at 41, and the ropes 39 pass over pulleys 42 so that the burner chassis 28 is suspended at four points. Movement of the piston in the cylinder 31 under control of the control valve 33, which is connected to a compressed-air line 43, effects a regulated vertical reciprocation of the profile burners with respect to the assembly on the support 2. Each burner 27 is supplied with a gas/air mixture through a pipe 44 connected to a supply 45.

Each of the burners 27 has in its face which is opposite an edge of the assembly a slot to which is supplied a mixture of combustible gas and air in known manner; and it provides a sheet of flame which is continuous in a horizontal direction for applying welding heat to the adjacent edges of the assembly located at the welding station. In order to obtain uniform distribution of welding heat across the edges of the assembly, the burners are reciprocated vertically, under the control of the pedal 33, through a distance sufficient to cause the flames to play equally over the whole height of the edges of the assembly. This is of particular importance in the manufacture of multiple glazed units consisting of three or more panes.

Before the flames from the burners 27 are applied to the edges of the assembly a movable open marginal frame 46, which may be water cooled, is lowered on to the marginal part of the assembly, where it shields the centre part of the top pane from the heat of the welding flames. The weight of the frame 46 together with any additional downward force that may be applied to it, for example by the addition of weights as hereinafter described, is such that it holds together the assembly of panes 1 and spacer elements 3 so that they do not become relatively displaced during the welding operation and also prevents any lifting of the corners of the panes that might otherwise occur as a result of the unsupported weight of their centre portions. The clamping effect of the weight of the frame upon the edges and corners of the assembly also helps to minimise sagging of the centre portions of the panes as a result of their own unsupported weight.

The frame 46 carries a sheet 47 of heat insulating material such as asbestos millboard which extends across the frame and conserves the heat in the top pane obtained from the oven and so serves to maintain the temperature of that part of the top pane which is within the frame 46, at substantially the temperature of the oven 12. The heat in the other pane or panes of the assembly is maintained by the hot top pane and by the insulating effect of the support 2. Thus, the temperature of the centre part of each pane during the application of welding heat to the edges is maintained at a level above that at which harmful strains can be induced in the glass.

The frame 46 is detachably supported by rods 48 from a second chassis 49, see FIGURE 2, which at each corner is provided wtih a wheel 50 which runs on a guide plate 51 carried on the adjacent post 23 at the welding station. A link 52 is pivotally connected to each side of the chassis 49, as indicated at 53, and to one end of a lever 54. The two levers 54 are mounted on a shaft 55 to which is secured a lever arm 56, which is disposed for manual operation to raise or lower the chassis 49, and thus the frame 46. The weight of the frame 46 and the chassis 49 is balanced by counterweights 57 attached to ropes 58 which pass over pulleys 59, 60, and are connected to the links 52.

After the glass assembly has been heated in the oven, as already described, the assembly of glass panes 1 and spacer elements 3 on the support 2 is moved to proper location at the welding station 13 by rotating the handle 22, and the lever 56 is actuated manually to lower the marginal frame 46 on to the top pane of the assembly. The frame 46 then lies on the entire peripheral edge of the top pane 1 of the assembly. The flames from the profile burners 27 are then played on the edges of the assembly. The intensity of the flame which is applied first of all is lower than that which gives the normal welding temperature, and then the intensity of the flame is progressively increased until a flame giving a welding temperature is produced, so that the edges are heated to fusion temperature, for example 1,200° C. to 1,250° C. on the outer surfaces of the edges in contact with the flames. During heating, the marginal frame 46 is pressed down on to the assembly by manual effort applied to the lever 56. In practice, this effort may be relaxed after about 30 seconds have elapsed from the beginning of the application of the flames, so that a depression is not produced in the fused glass by the pressure of the frame. The frame is retained in contact with the top pane, however, until the welding operation is completed. The frame may be provided with pins on which weights may be located to regulate the downward pressure exerted by the frame 46. Alternatively the frame 46 may be interchanged for a frame of a different weight.

The panes 1 and spaced elements 3 are thus fused together from their outer edges inwards, and with the edge temperature at 1,200 to 1,250° C., the inner limit of the weld reaches a temperature of about 850° C. to 900° C., thus a weld which extends inwards of the assembly is obtained and the assembly of panes and interposed elements which become spacer frames are thus welded into a unit.

During the welding operation a large difference in temperature exists between the edges of the assembly and the remainder of the area of each pane, and in order to avoid excessive stresses in the welded unit during annealing the edges are cooled to a temperature about 100° C. to 150° C. above the temperature which has been maintained in the remainder of the assembly, that is to about 600° C. to 650° C. This may be done at the welding station by reducing the intensity of the burner flame so that the flame playing on the edges of the unit becomes a flame of lower intensity than that which gives the normal welding temperature, and under this mild heating the temperature of the edges falls at a safe rate to the temperature of 600° C. to 650° C. The marginal frame 46 is then lifted from the assembly, and the welded unit is moved forward on the support 2 into an annealing lehr indicated at 14, where the rate of cooling is controlled in known manner.

The lehr may accommodate the welded units in a horizontal position on their supports 2, or if more convenient the units may be supported in a vertical position during their travel through the lehr.

When the panes 1 and spacer elements 3 are being prepared for assembly on a support 2, provision is made for vents which permit access to the interspace between adjacent panes, and through which the interspace is flushed with dry air after the assembly has been welded into a unit and has been annealed and cooled.

Usually each interspace requires two vents which may be situated anywhere in the marginal part of the unit: but each interspace in units which are not larger than 30 inches by 24 inches, for example, can be flushed effectively through a single vent. It is convenient for the vents to be formed in the spacer elements rather than in the panes 1, and in a multiple glazed unit this is necessary for all the inner interspaces.

The vents can be formed in a variety of ways, for example when the spacer elements are to be mitred together at the corners, a notch or groove may be cut or ground in adjacent oblique ends of the elements so that when the spacer frame is produced by the welding a vent hole is formed through the frame at the corner of each interspace. Each vent may be formed adjacent a pane, that is to say not in the middle of the thickness of the spacer frame.

Patterned as well as transparent glass panes can be welded to spacer frames in accordance with the invention, with the patterned surfaces against the frames. The pattern may for example be prismatic, rough cast, morocco or reeded, and patterned or obscured multiple glazed units so made have the advantage that the external surfaces are smooth and easily kept clean.

A sheet of material containing fibres, for example glass fibres can also be incorporated, giving light diffusion and increased heat insulation.

Where the assembly of panes and spacer elements coming from the oven 12 is of less small size than the frame 46, the assembly can be welded in two stages by suitably disposing the assembly on the support 2 and then advancing the assembly from the oven to a position at the welding station 13 in which two contiguous edges of the assembly underlie contiguous edges of the frame 46. The frame 46 can then be lowered, and contiguous burners alongside the two edges of the assembly to be welded, operated to produce the desired welding heat, while the gas supply to the other burners may be adjusted to maintain the heat in the assembly given to it by the preheating in the oven 12.

After the welding of the two contiguous edges, the frame 46 can be raised and the assembly moved diagonally of the frame 46 so that the opposite two contiguous edges of the assembly are brought into register with the two other edges of the frame 46. The latter is then lowered and the welding operation effected under exactly the same conditions which are described for the first two contiguous edges of the assembly.

This manner of operation can be conveniently effected by erecting at the side of the rails 7 an ancillary structure, shown in plan view in FIGURE 5, for use in displacing an assembly of glass panes and spacer elements. The ancillary structure is disposed at the requisite level to displace the assembly with respect to the frame 46 in order to accomplish the two stage welding to which reference has just been made. To this end a rod 61 of rectangular cross-section is mounted to be slidable in bearings 62, which in turn are slidably carried on rods 63, supported on parallel angle bars 64, carried on posts 65 which may be bolted to the frame of the apparatus in any suitable manner. The rod 61 carries a pusher plate 66 which can be advanced or retracted from the frame 46 by axially displacing the rod 61 through the bearings 62. Additionally, the rod 61 can be moved laterally by sliding the bearings 62 along the rods 63.

With such an arrangement adjacent to the welding station an assembly can be moved from the oven to the welding station on the support 2, by actuating the handle 22 which produces the desired longitudinal displacement of the assembly with respect to the frame 46 and if necessary the rod 61 can be actuated to displace the assembly across the support so as to produce the desired registration with the burners 27. After the welding operation has been performed on two contiguous edges and after the frame 46 has been retracted, the handle 22 can be again actuated to longitudinally displace the assembly until the transverse edge, which has not been welded, is brought into registration with the corresponding edge of the frame 46. Thereafter the pusher 61 is actuated until the other of the two contiguous edges of the assembly is brought into registration with the other edge of the frame 46. The welding operation is then effected on the other two contiguous edges and frame 46 retracted.

The welded unit may remain in the last position of welding or may even be retracted backwards by reverse movement of the handle 17 so that the assembly may be cooled whilst located substantially symmetrically within the heated atmosphere produced by the burners, and as previously mentioned the cooling may be effected by reducing the intensity of the burner flame so that the flame is of lower intensity than that which gives the normal welding temperature.

In the construction described oven 12 is provided with one door 67, which can be raised and lowered by moving the weight 68, which is connected with the door by a rope 69 passing over pulleys 70 and 71.

In such construction the carriage 5 after being loaded on the other side of the welding station to the oven 12, can be advanced through the welding station into the oven when the door 67 is raised and then returned to the welding station after the assembly has been sufficiently heated.

In accordance with the invention the oven may be provided with a similar door at each end and the rails 7 extended through the oven so that the carriage 5 can be advanced through the oven and loaded on the side of the oven away from the welding station, and then drawn into the oven for the pre-heating operation before being further advanced in the same direction to the welding station.

In such arrangement the method of carrying out the present invention involves loading the carriage, advancing it to the pre-heating oven 12 and then closing the door at the entry end of the oven. The assembly then remains in the oven while it is pre-heated and the door 67 is raised to permit continued advance of the assembly to the welding station, where welding and the desired degree of cooling are effected before the welded unit is advanced to the annealing lehr.

Figure 7:
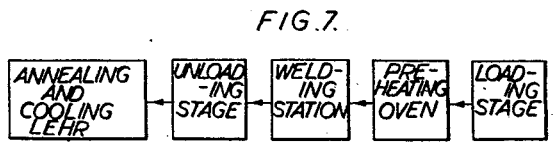
FIGURE 7 shows diagrammatically a sequence of operations for producing multiple glazed units according to the invention.

When the unit has been cooled at the welding station so as to be ready to be put into the annealing lehr the carriage is moved to advance the unit from the welding station to a ramp 72, which may be erected on the framework carrying the rails 7 and on to which the unit is pushed from the carriage 5, the ramp 72 leading to the usual conveying rollers indicated at 73 in the annealing lehr 14, by which the unit is transported through the stages of annealing and cooling. This sequence of events is diagrammatically illustrated in FIGURE 7 of the drawings, and in order that the continuous operation may be effected without much loss of heat from the oven, the oven door at the entry end and the door 67 may be provided with slots at the bottom edge through which pass the shafts 4 of the carriage which are suitably elongated, so that the shafts may be loaded at the entry side of the oven.

To minimise loss of heat from an assembly at the welding station to either the support 2 or to the overlying frame 46, heat insulating media may be interposed between the assembly and the support and between the assembly and the overlying frame, such insulating media preferably being in the form of asbestos sheet material.

As clearly shown in FIGURE 1, the frame 46 which in the construction shown has an outside dimension corresponding to the profile of the assembly, may be rabbeted as indicated at 74 opposite to the burner so as to reduce the area of conduction between the assembly and the frame and to prevent loss of heat from the assembly by radiation to the frame.

An advantage of reducing the area of conduction between the assembly and the frame is that a greater intensity of pressure from the weight of the frame is imposed on the assembly, and if heat insulating material is located between the assembly and the frame and the support maximum insulating against heat losses is obtained.

Clearly the spacer elements used in accordance with the invention may be fused together to form a frame, or in pairs to form half frames before being interposed between the associated panes of an assembly.

By the present invention multiple glazed units, including double glazed units, including more than two panes are readily assembled, hence efficient insulating windows for very low-temperature applications such as in self-service, deep-freeze cabinets in shops can be readily manufactured, as well as multiple glazed window units for use for example in railway vehicles, aircraft, or buildings.

We claim:

The method of manufacturing an integral welded multiple glazed unit composed wholly of glass, which consists in (1) stacking flat rectangular glass panes in desired superposed parallel relation with interposed spacer elements composed of the same glass as the panes and which thus possess the same thermal characteristics as the panes, said spacer elements (a) being in the form of flat rectangular open frames extending around the entire marginal area of the panes and having their outer edges flush with the outer edges of the panes, (b) being of equal thickness and of equal width and determining the dimensions of the spaces between adjacent panes, and (c) making direct face contact throughout their width with the glass panes around the entire marginal area of the panes, (2) preheating the assembly of glass panes and glass spacer elements to a temperature below welding temperature but above a temperature at which harmful strains can be induced in the assembly when direct welding heat is applied thereto in the manner set forth below, (3) applying a downward pressure simultaneously and uniformly over the whole marginal area of direct face contact between the panes and the spacer element frames but confining the pressure to such area, (4) then, while the downward pressure is continued, applying direct welding heat to the assembly until the glass panes and the interposed glass spacer element frames are both melted and interfused directly together as a homogeneous mass, (a) said direct welding heat being applied only to the outer edges of the glass panes and of the glass spacer element frames and thus decreasing progressively inward across the marginal area of direct face contact between the panes and the spacer element frames, (b) whereby the glass panes will be maintained in original parallel spaced relation by the inside edge portions of the spacer element frames while the welding of the panes to the outer edge portions of the frames takes place, and (5) maintaining the temperature of the center part of the glass panes within the marginal area of contact with the glass spacer element frames at substantially the aforementioned preheating temperature throughout the welding operation.

References Cited in the file of this patent

UNITED STATES PATENTS

| | | |
|---|---|---|
| 1,548,611 | Kearsley et al. | Aug. 4, 1925 |
| 2,032,033 | Clause | Feb. 25, 1936 |
| 2,198,578 | Hazelton | Apr. 23, 1940 |
| 2,389,360 | Guyer et al. | Nov. 20, 1945 |
| 2,398,371 | Gerspacher | Apr. 16, 1946 |
| 2,398,525 | Gray | Apr. 16, 1946 |
| 2,480,364 | Hansen et al. | Aug. 30, 1949 |
| 2,518,690 | Holman et al. | Aug. 15, 1950 |
| 2,521,048 | Day | Sept. 5, 1950 |
| 2,597,097 | Haven | May 20, 1952 |
| 2,598,286 | Mulder et al. | May 27, 1952 |
| 2,624,978 | Hohmann | Jan. 13, 1953 |
| 2,624,979 | Clever et al. | Jan. 13, 1953 |
| 2,643,020 | Dalton | June 23, 1953 |
| 2,749,668 | Chaffotte et al. | June 12, 1956 |
| 2,761,248 | Cowley et al. | Sept. 4, 1956 |
| 2,761,249 | Olson et al. | Sept. 4, 1956 |
| 2,793,472 | Heer et al. | May 28, 1957 |
| 2,861,398 | Woods | Nov. 25, 1958 |
| 2,876,596 | Kessler | Mar. 10, 1959 |

FOREIGN PATENTS

| | | |
|---|---|---|
| 433,489 | Great Britain | May 15, 1935 |